United States Patent [19]

Darden et al.

[11] Patent Number: 5,210,810
[45] Date of Patent: May 11, 1993

[54] HERMAPHRODITIC CONNECTOR FOR SINGLE FIBER OPTICAL CABLE

[75] Inventors: Bruce V. Darden, Lawrenceville; Dean R. Frey, Dunwoody, both of Ga.

[73] Assignee: AT&T Bell Laboratories, Murray Hill, N.J.

[21] Appl. No.: 812,240

[22] Filed: Dec. 19, 1991

[51] Int. Cl.[5] .............................................. G02B 6/38
[52] U.S. Cl. .................................................... 385/78
[58] Field of Search ....................... 385/60, 66, 67, 68, 385/78, 84

[56] References Cited

U.S. PATENT DOCUMENTS

| | | | |
|---|---|---|---|
| 4,258,977 | 3/1982 | Lukas et al. | 385/60 |
| 4,812,009 | 3/1989 | Carlisle et al. | 350/96.21 |
| 4,863,235 | 9/1989 | Anderson et al. | 350/96.21 |
| 4,913,514 | 4/1990 | Then | 385/60 |
| 4,934,785 | 6/1990 | Mathis et al. | 350/96.21 |

Primary Examiner—John D. Lee
Assistant Examiner—John Ngo
Attorney, Agent, or Firm—D. E. Hayes, Jr.

[57] ABSTRACT

A single optical fiber hermaphroditic connector (20) includes a ferrule or plug (90) of a subassembly which terminates an optical fiber (22) of a cable (24) and an end of which is received in a cavity of a housing (83). Furcations (102,102) of a bifurcated member extend beyond a free end of the ferrule. An end of the housing is supported from one free end of a tubular member (70) such that a compression spring (106) disposed about the housing causes the ferrule to be biased outwardly. An opposite end of the tubular member is connected to a bushing and tapered plug arrangement which is effective to transfer forces from strength members of the cable to the connector to prevent the forces from being applied to the connection. The subassembly is received in a sleeve (50) having a small diameter threaded end adjacent to the force transfer arrangement and an enlarged diameter, externally threaded end which encloses the housing and the bifurcated member. A coupling nut (150) having an internally threaded end is disposed about the sleeve and is adapted to receive a free end of another single fiber hermaphroditic connector such that the internally threaded free end of the coupling nut is turned into engagement with the externally threaded enlarged end of the sleeve of the other connector to hold together the connectors.

20 Claims, 5 Drawing Sheets

HERMAPHRODITIC CONNECTOR FOR SINGLE FIBER OPTICAL CABLE

TECHNICAL FIELD

This invention relates to a hermaphroditic connector for a single fiber optical cable. More particularly, this invention relates to a hermaphroditic ferrule type connector for a single optical fiber, the connector being one which is relatively small in size.

BACKGROUND OF THE INVENTION

In order to assure that low loss optical fibers which are produced today are not diminished in their effectiveness in systems, the fibers are connected through intermateable connectors which preserve those low losses. Desirable is the use of a hermaphroditic connector in which each optical fiber may be terminated with such a connector and joined to another such connector without the need for any intervening device such as a coupling. One of the advantages of such a system is that it obviates the need to inventory couplings and avoids the possibility for misplacing same in the field. Further, the deployment in the field of cables each end of which is terminated with a hermaphroditic connector avoids the mistake of juxtaposing an end of a cable terminated with a hermaphroditic connector with an identical non-mateable terminated end of another cable.

Another desired property of an optical fiber connector is the avoidance of forces applied to the optical connection between two connectors. In at least one optical fiber cable of the prior art which is to be terminated with a plug, a core comprising at least one optical fiber is enclosed in a jacket, non-metallic filamentary strength members such as polymeric yarn, for example, and an outer jacket. It becomes important to prevent the transmittal of tensile forces to optical fibers at their terminations with the plugs. If this is not done, the fibers may be broken or microbending losses in the fiber may occur and degrade the quality of the transmission. Also, any forces which are not diverted to other portions of the connector may be imparted to a plug thereby disturbing its seating in a coupling sleeve and its critical alignment with the other plug.

In order to avoid such losses at a connection, provisions must be made for avoiding the application of forces to the optical fibers after portions of a sheath system of the cable have been removed for termination. Instead, any pulling forces must be transferred to a connector housing. When a connection is to be made, the strength members must be coupled to a housing portion of the connector so that forces are transferred to the housing before the forces reach the optical fiber terminations.

This requirement becomes even more important in special environments. For example, what is needed is an optical fiber connector assembly to withstand stringent environmental and mechanical requirements which are imposed on military as well as on commerical communications equipment. One requirement is that there is no attenuation increase at an operating tensile load of about 1700 Newtons. The transfer of forces from the cable to the connector housing instead of to the plugs must be made simply and through a termination of the strength members.

Available in the prior art is a hermaphroditic dual biconic optical fiber connector which is effective to terminate an optical fiber cable which includes two optical fibers and a non-metallic, filamentary strength system. Included in the connector are a housing having a longitudinal axis and force transfer means disposed adjacent to a cable entrance end of the housing and through which the optical fibers extend.

The force transfer means is effective to clamp the non-metallic strength system of the cable to transfer forces from the cable to the housing. Also, the force transfer means includes two conformable, substantially smooth conically shaped surfaces which are held in mating relationship with each other with portions of the strength member system therebetween. Each surface diverges in a direction from the cable entrance end of the housing toward another end such that an included angle between diametrically opposed lines on each of the surfaces which are disposed in a plane passing through the axis of revolution of each surface does not exceed a predetermined value.

Conically shaped plugs which terminate the optical fibers in the prior art hermaphroditic, dual biconic connector are disposed adjacent to the other end of the housing with a plug associated with one of the fibers being disposed in an alignment sleeve which in an opposite end thereof is adapted to receive a plug which terminates an optical fiber of another such connector to be assembled to this connector. Retaining facilities are disposed at an entrance to the other end of the housing to retain the sleeve in the housing and to guide a sleeve of another connector to cause another plug of this connector to be received in one end of the sleeve of the other connector. See U.S. Pat. No. 4,863,235 which issued Sep. 5, 1989 in the names of J. M. Anderson, et al.

The hereinbefore-described hermaphroditic connector is well suited to cables which include two optical fibers and which are to be terminated with biconic connector plugs. However, presently, there is much interest in the use of smaller ferrule connectors such as AT&T's ST ® connector. Further, there are many instances when only single fiber optical cables are used. For the many applications of such a cable, there is a need for a single fiber hermaphroditic connector in which one terminated fiber cable may be connected directly to another such terminated fiber cable without the need for any intervening coupling device such as a coupling sleeve.

Seemingly, the prior art is devoid of a single optical fiber hermaphroditic ferrule connector. The sought-after single fiber hermaphroditic connector should be one in which non-metallic filamentary strength is maintained as such during the application of forces to the cable while not compromising the integrity of the strength members. Desirably, connection of the strength members to the connector is accomplished in a manner which causes the secured terminations to be enhanced when the cable is subjected to tensile forces.

SUMMARY OF THE INVENTION

The foregoing problems of the prior art have been overcome by the single fiber hermaphroditic connector of this invention. A single optical fiber hermaphroditic connector comprises a tubular member through which an optical fiber extends. The connector also includes a ferrule which is adapted to terminate an end portion of a single optical fiber and which is disposed adjacent to one end of the tubular member. Supporting means is disposed adjacent the one end of the tubular member for holding the ferrule which terminates an end portion of the optical fiber. The supporting means includes circumferentially spaced portions which extend longitudinally along and beyond a portion of the ferrule. A sleeve in which are received the tubular member and the supporting means includes circumferentially spaced longitudinally extending fingers each of which is disposed outside but aligned with an associated longitudinally extending portion of the supporting means. Securing means engages the sleeve adjacent to the ferrule for causing another identical single fiber hermaphroditic connector to be held in aligned juxtaposition with the connector such that each longitudinally extending portion and associated finger of the other connector are received between two sets of longitudinally extending portions and associated fingers of the connector such that end faces of the ferrules of the connectors are disposed in optical connective engagement with each other.

Force transfer means may be disposed at one end of the tubular member for receiving an optical fiber cable at one end thereof and for transferring forces which may be applied to the cable to portions of the connector displaced from the plane of connection with another identical connector.

BRIEF DESCRIPTION OF THE DRAWING

Other objects and features of the present invention will be more readily understood from the following detailed description of specific embodiments thereof when read in conjunction with the accompanying drawings, in which.

DETAILED DESCRIPTION

Figure 1:
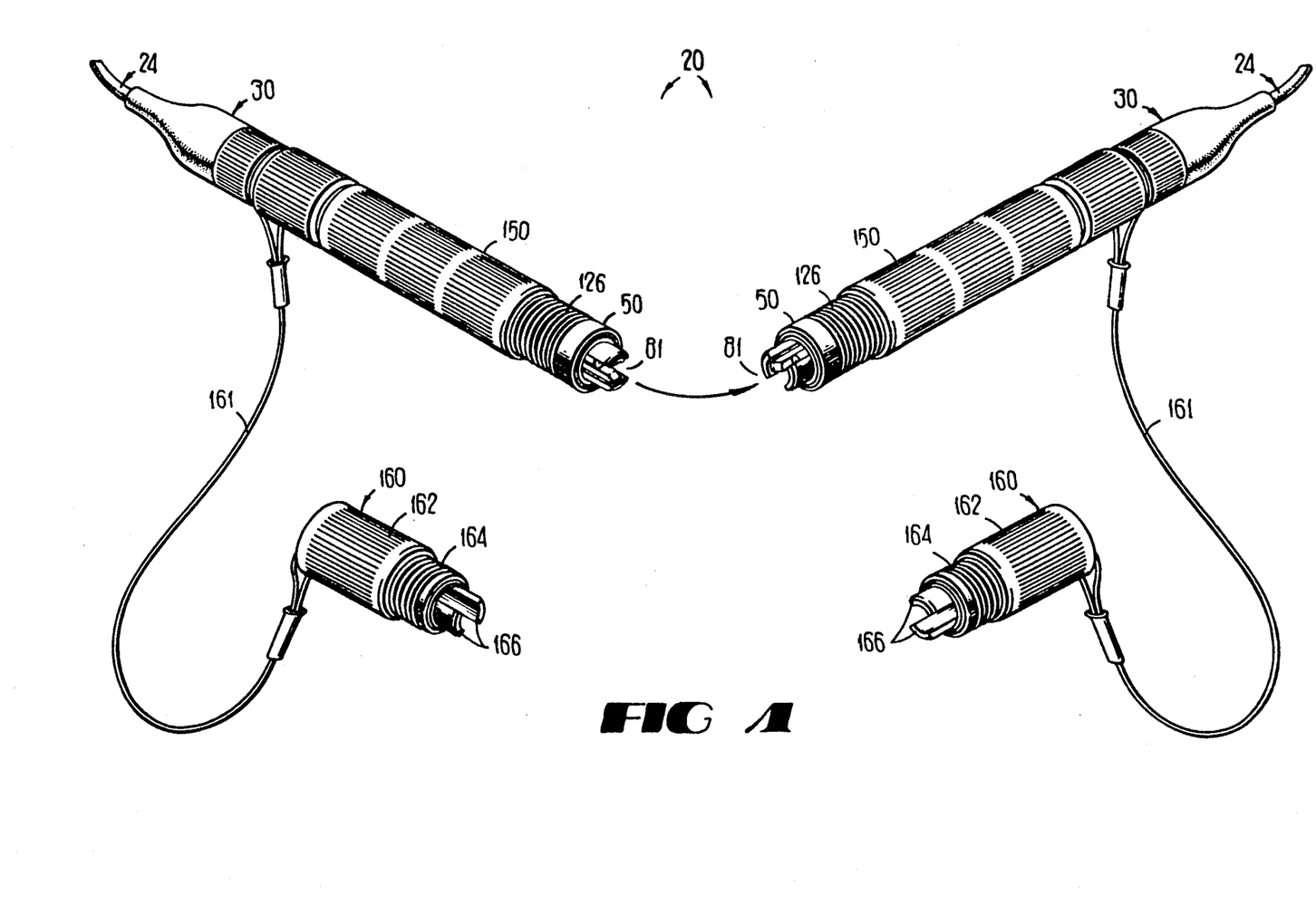
FIG. 1 is a perspective view of two single optical fiber cables each terminated by a hermaphroditic connector of this invention with the two connectors being juxtaposed for interconnection.
Figure 2:
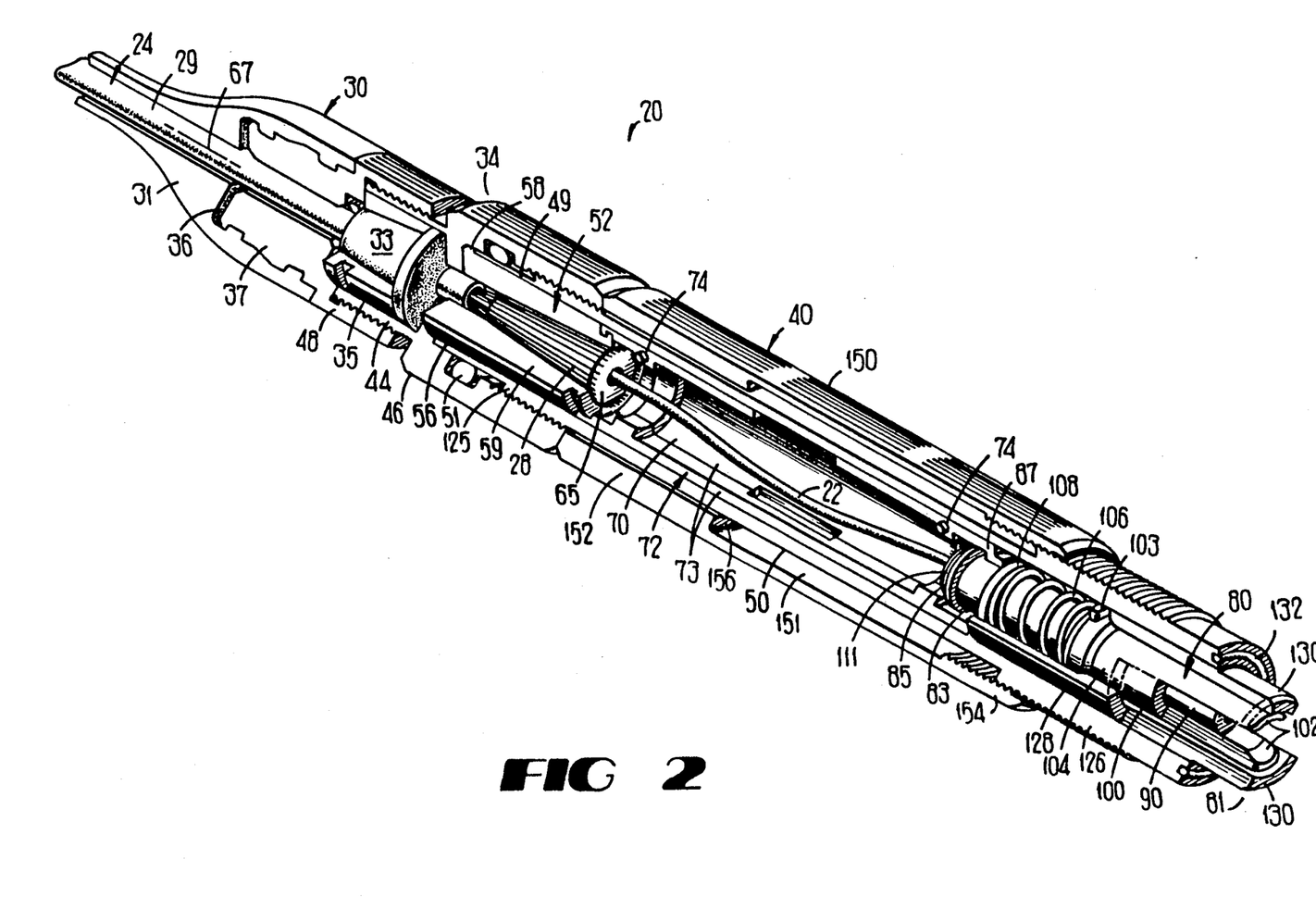
FIG. 2 is a perspective view of one of the two single optical fiber connectors of FIG. 1 with portions thereof broken away.
Figure 3:
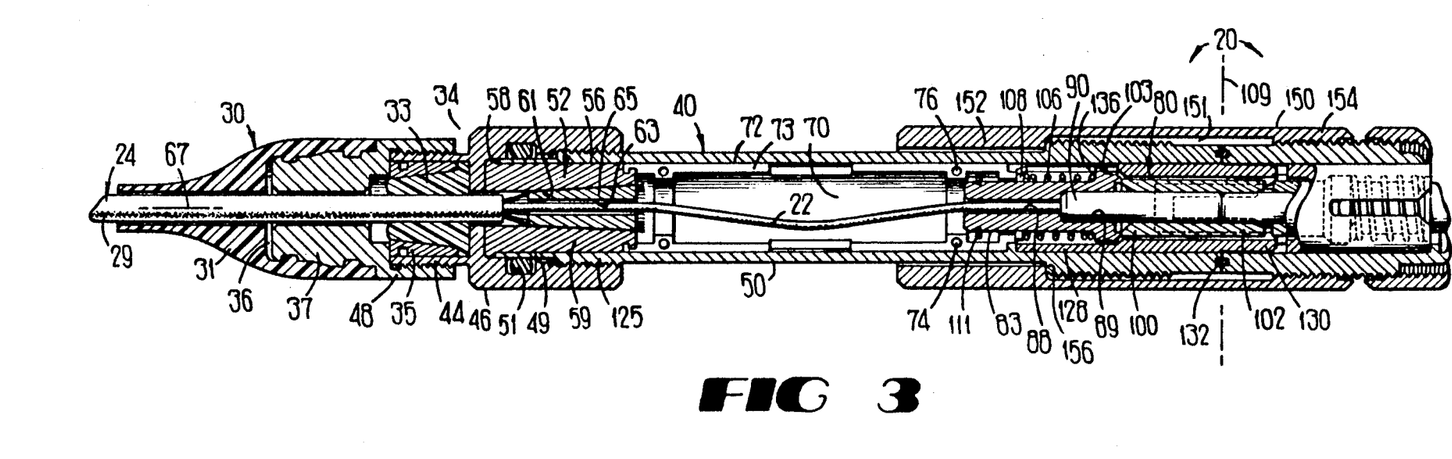
FIG. 3 is an elevational view partially in section of a hermaphroditic ferrule connector for a single fiber optical cable which is connected at the right hand side thereof to another such connector.

Referring now to FIGS. 1-3, there is shown a single optical fiber hermaphroditic connector which is designated generally by the numeral 20 and which is used to terminate an optical fiber 22 of an optical fiber cable 24. Each optical fiber 22 may include a buffer cover which is made of a plastic material. The optical fiber 22 is enclosed with a strength member system 28 (see also FIG. 2) which may comprise a polymeric yarn material and preferably a KEVLAR® yarn, for example. A jacket 29 which may be made of a plastic material encloses the yarn. The connector 20, which may be referred to as a first connector, is adapted to cause the optical fiber terminated therein to become connected to an optical fiber which is terminated in a second connector, which is identical to the first connector.

The cable 24 extends through a strain relief portion 30 which is disposed at a cable entrance end 34 of the connector and which includes a somewhat conically shaped bend limiter 31. Also, the cable 24 extends through a cable sealing member 33, which may be made of neoprene, for example, and which is held in tight engagement with the cable 24 by a cable seal wedge 35. The bend limiter 31 includes a cavity 36 therein in which is received a metallic insert 37.

The cable 24 extends through the strain relief portion 30 and into a main portion 40 of the connector 20. Interposed between the cable seal wedge 35 and the metallic insert 37 of the strain relief portion is a depending portion 44 of an end cap 46. The depending portion 44 of the end cap is threaded externally and is turned into an internally threaded cup-shaped portion 48 of the insert 37. As the insert 37 is turned onto the cap 46, an internal shoulder of the insert engages the wedge 35 and urges it to the right as viewed in FIG. 3 compressing the sealing member 33 to form a seal in engagement with the internal shoulder of the insert.

As may be viewed in FIG. 3, the right side portion of the end cap 46 is threaded internally so that the end cap can be turned onto an end portion 49 of a cylindrically shaped connector sleeve 50. An O-ring 51 is disposed between the cap 46 and the end portion 49 of the sleeve 50. In a preferred embodiment, the connector sleeve 50 is made of a metallic material such as aluminum. The connector sleeve 50 is adapted to house a device for terminating an optical fiber and a strength member retention system or device 52 which is effective to prevent tensile pulls on the cable from being transferred to the optical fiber and to its terminations with a plug portion of the connector 20.

Figure 4:
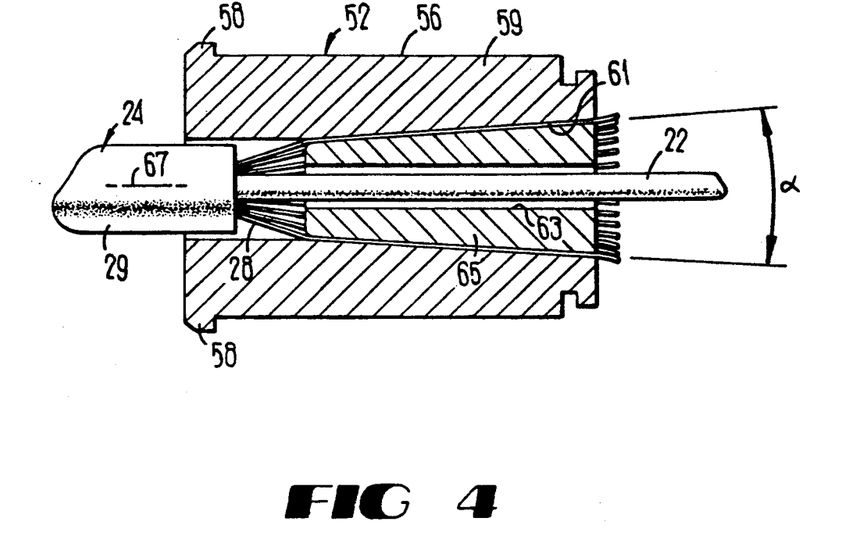
FIG. 4 is an enlarged elevational view in section of a force transfer portion of the connector of FIG. 1.

Viewing now FIGS. 2,3 and 4, it can be seen that the device 52 includes a bushing 56 having two diametrically opposed, radially extending tabs 58—58 and a hub 59. A passageway 61 is formed through the bushing and is tapered with the samll diameter portion oriented toward the bend limiter 31. The cable 24 extends for a short distance within the bushing whereafter the jacket 29 of the cable is removed to expose the strength member yarn and the optical fiber.

The optical fiber 22 extends through a bore 63 of a wedge 65 which is disposed within the passageway 61 of the bushing 56. Desirably, an included angle, $\alpha$ (see FIG. 4), between diametrically opposed lines on the inner surface of the tapered passageway 61 that appear in a sectional view when a plane is passed through the axis of revolution of that surface which generally is coincident with a longitudinal axis 67 (see FIG. 2) of the sleeve 50 does not exceed a predetermined value. It has been found that $\alpha$ should not exceed a value of about 6° and preferably is about 3°.

The strength member yarn is disposed between the tapered inner surface 61 of the bushing and a conformable tapered external surface of the wedge. As a result, portions of the strength member system 28 are held between these surfaces and any pull which is imparted to the cable 24 is transferred by the strength member system to the sleeve 50.

The wedge 65 and the bushing 56 cooperate to provide a self-enhancing locking arrangement for the strength member system 28 of the cable 24. Pulling forces which are applied to the cable 24 at the strain relief end are transferred to portions of the strength member system 28 which causes the wedge 65 to move to the left as viewed in FIG. 3. As this occurs, the wedge 65 becomes seated further in the passageway 61 of the bushing thereby further locking the yarn and preventing any strain from being transferred to the optical fiber.

In order to achieve a substantial locking action without damaging the non-metallic strength member system 28, the bushing 56 and the wedge 65 must be further characterized. The conformable surfaces of the wedge 65 and the bushing 56 must be substantially smooth. If not, portions of the non-metallic strength member system 28 conform to the surface roughness. As a result, non-uniform pressure as between portions of the roughened surfaces causes those portions of the strength member system to be crushed and non-effective in the transfer of forces from the cable 24 to the housing sleeve 50.

Also, the included angle $\alpha$ is important in reducing the angle which portions of the strength member system make as they exit the cable 24 and become disposed between the wedge 65 and the bushing 56. The greater the angle which the portions of the strength member system 28 make with the longitudinal axis 67 of the connector, the greater the probability for portions of the strength member system to break about the entrance to the annular conical space between the complementary surfaces. Further, the intersection between the outer surface of the wedge 65 and its small diameter end surface is formed with a radius (see FIG. 4) to preclude damage to the non-metallic strength members.

It should be observed that this arrangement is advantageous from several standpoints. First, a locking arrangement which is selfenhancing is provided. The greater the pull, the greater the locking of the portions of the strength member system 28 within the connector 20. Also, portions of the strength member system 28 need not be retroflexed about a peripheral edge surface of a portion of the connector to secure the portions within the connector. Instead, the force-transfer portions of the strength member system are disposed at a relatively gentle angle to the longitudinal axis 67 of the housing between two substantially smooth surfaces.

Forward of the device 52 is a cavity 70 (see FIGS. 2 and 3). In the connector cavity 70, a length of buffered optical fiber 22 extends to be terminated. A length of the buffered fiber is enclosed in a tubular shell assembly 72 comprising two semi-cylindrical portions 73—73 (see also FIG. 5). Each of the portions includes two spaced pins 74—74 along one longitudinal edge surface and two recesses 76—76 along an opposite edge surface. Further, one end 77 of each of the portions 73—73 is formed with a groove 78 to form a collar to receive a flange end 79 of the bushing 56.

An opposite end of the tubular assembly 72 is adapted to receive an end of a ferrule assembly, designated generally by the numeral 80 in a plug end 81 (see FIG. 2) of the connector 20. The ferrule assembly 80 includes a cylindrical metallic member or housing 83 having an end 85 and a flanged end 86 (see FIG. 5). The end 85 is received in an entry portion 87 which is formed in the portions 73—73 of the tubular member 72. When the tubular member 72 is assembled with the end grooves thereof receiving the flange 79 of the bushing 56 and the flange 85 of the metallic member 83, the tubular member is effective to space apart the force transfer portion from the ferrule assembly 80.

As can be seen in FIG. 3, the cylindrical member 83 includes a bore 88 therethrough. The bore 88 opens to a larger cavity 89 in which is received an end portion of a plug or ferrule 90 comprised of a suitable material such as a ceramic material, for example. The plug 90 is cylindrically shaped and includes a bore 92 extending therethrough (see FIG. 5).

A coated single optical fiber 22 which has been provided with a buffer comprised of a plastic material such as polyvinyl chloride, for example, is terminated with the plug 90. The jacketing material and the coating are removed from an end portion of the buffered fiber. Then, the buffered fiber is inserted into the bore 88 until the bared end portion is received in the passageway 92 with an end portion of the fiber 22 extending to an end face of the plug 90. An end face of the end portion of the fiber 22 is coincident with the end face of the plug 90.

The plug ferrule 90 is disposed within a hermaphroditic portion 100 which includes a plurality of longitudinally extending portions such as one disclosed in co-pending application Ser. No. 07/810,617 filed of even date herewith in the names of B. V. Darden and V. E. Kalomiris. In the preferred embodiment, the hermaphroditic portion 100 comprises a bifurcated alignment member. The bifurcated alignment member 100 includes two longitudinally extending portions or furcations 102—102 (see FIGS. 2 and 5) connected to a hub 104 to which the member 83 is attached. A key 103 (see FIGS. 2, 3 and 5) which extends radially outwardly from the flanged end 86 is aligned with one of the longitudinally extending portions 102—102. A compression spring 106 is disposed about the exterior of the member 83 and engages the flanged end 86 and a retaining washer 108 which is moveably mounted on the member 83. A stationary C-clip 111 positioned in a groove 112 (see FIG. 5) at an end of the member 83 retains the washer. The retaining washer 108 is disposed outside the tubular shell assembly 72. As a result of the foregoing arrangement, the spring 106 causes the member 83 and the plug 90 to be biased forwardly toward the connection end and causes the end of the plug to be in a predetermined position beyond a connection plane 109 (see FIG. 3) before mating with another connector.

Figures 5, 6:
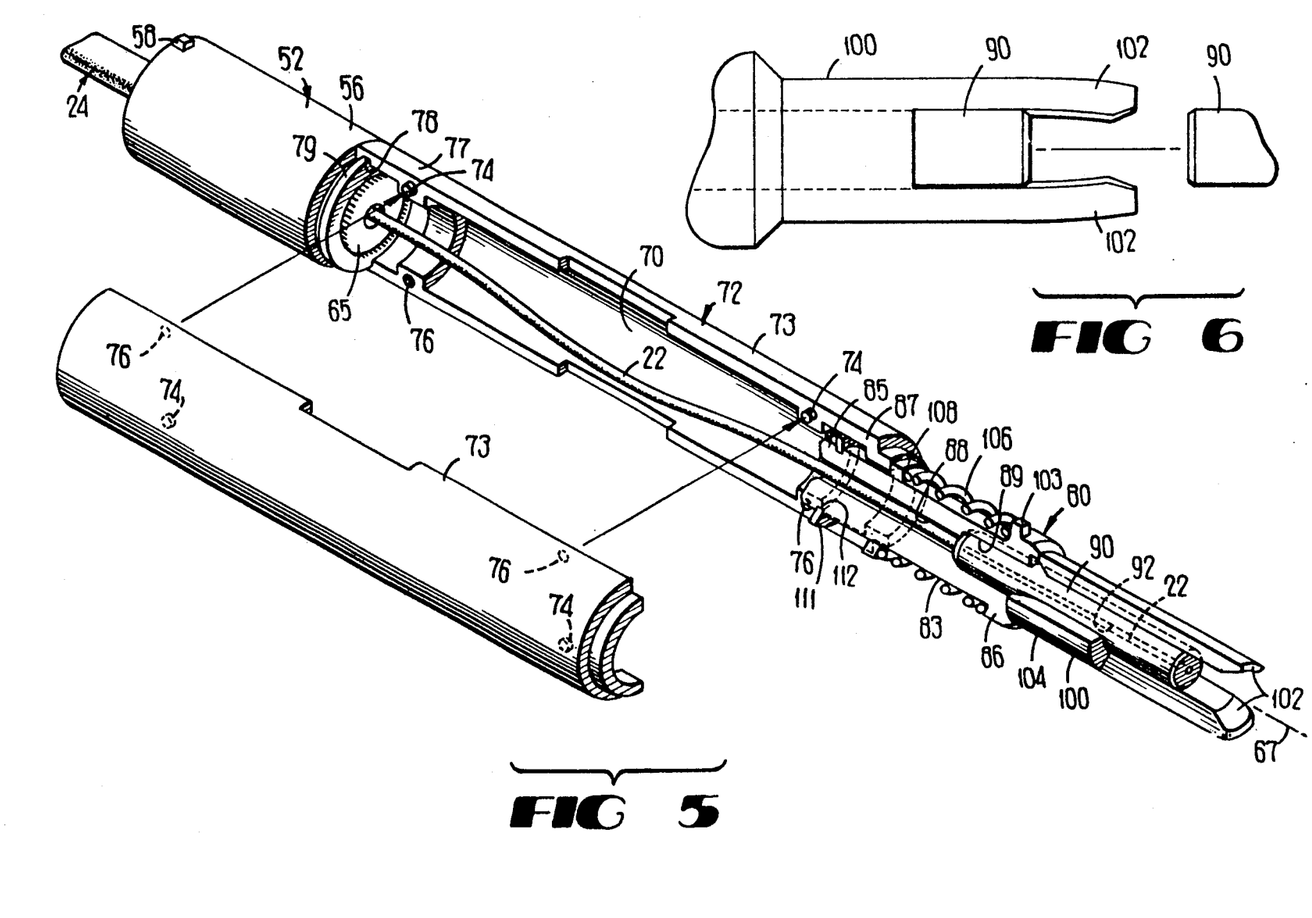
FIG. 5 is an exploded view of a tubular member which is disposed within a sleeve.
FIG. 6 is a detail view of longitudinally extending portions of an alignment member.

As can be seen in FIG. 6, the free end portion of the longitudinally extending portions 102—102 in a preferred embodiment are deflected toward each other. As a result, a portion of each longitudinally extending end portion has a generally uniform radius of curvature. The deflection of each end portion is only several mils, e.g., 0.002 inch, but is sufficient to cause an end portion of its associated ferrule and of a mating connector to be engaged by the longitudinally extending portions in a manner to insure alignment of the two ferrules and optical fibers terminated thereby.

Figure 7:
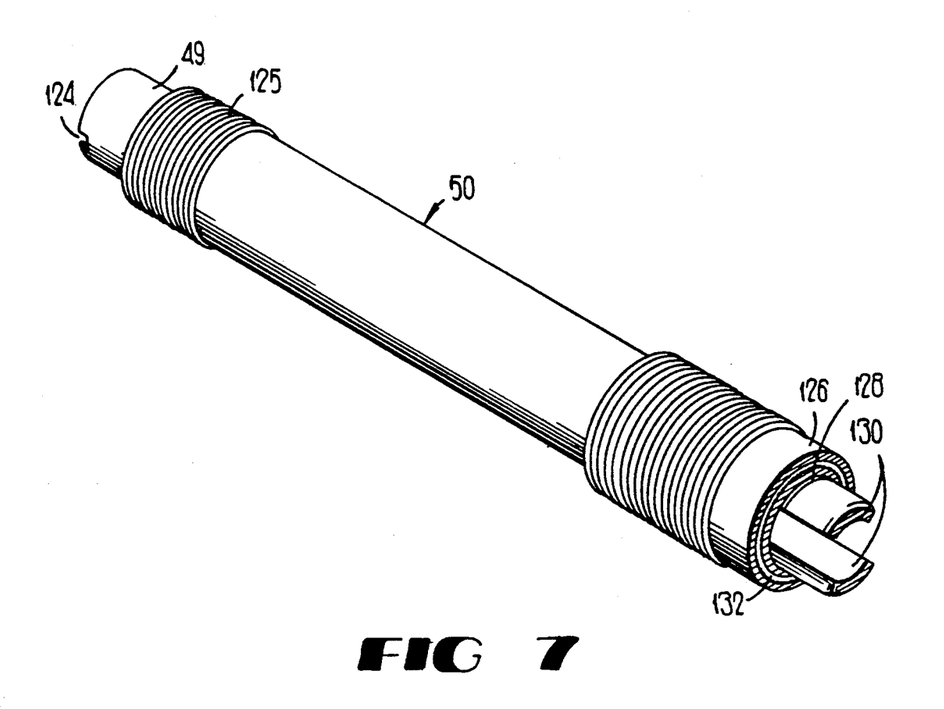
FIG. 7 is a perspective view of the sleeve in which is disposed the tubular member.

The ferrule assembly 80, the tubular assembly 72 and the force transfer assembly are adapted to be received within the sleeve 50. The sleeve 50 includes the end portion 49 (see FIG. 7) having two diametrically opposed cutouts 124—124 in a wall thereof. Recessed from the end portion 49 is an externally threaded portion 125. At an opposite end is disposed an enlarged diameter portion 126 a portion of which also is threaded externally. Also disposed at the opposite end is a reduced diameter portion 128 (see FIG. 7) which includes two longitudinally projecting fingers 130—130. The fingers 130—130 extend beyond an end of the enlarged diameter portion 128. An inner end of the reduced diameter portion 128 is provided with a keyway 136 (see FIG. 3).

As can be seen in FIG. 3, the radially projecting key 103 of the flanged end 86 is adapted to be received in the keyway 136 formed interiorly of the reduced diameter portion 128 of the sleeve 50. The connector assembly 80, the tubular assembly 72 and the force transfer assembly are oriented so that the key 103 is aligned with the keyway 136 and are moved into the sleeve 50 until the key 103 bottoms out in the keyway. At that time, the longitudinally extending portions 102—102, one of which is aligned with the key 103, are aligned with and generally coextend with the fingers 130—130 (see FIG. 2) with the free end face of the plug being disposed in a plane which extends through those portions and the fingers. Also, the cutouts 124—124 of the end portion 49 are moved over the diametrically opposed radially extending tabs 58—58 which project from the force transfer assembly.

Figure 8:
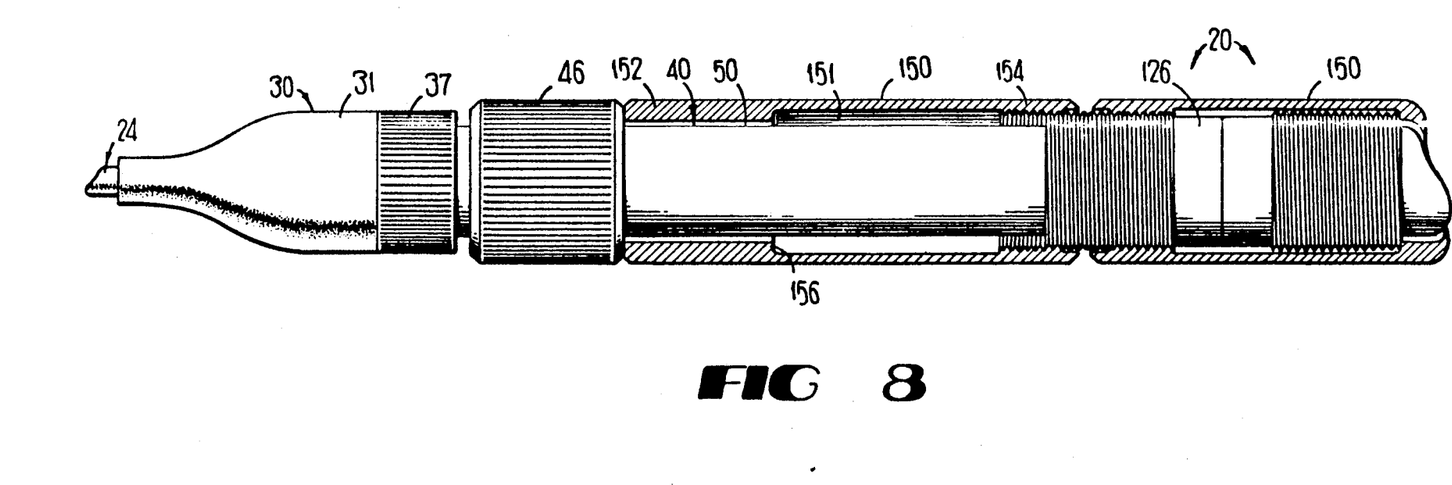
FIG. 8 is an elevational view partially in section showing a connection of two of the single fiber hermaphroditic connectors of this invention and facilities for securing together the two connectors.

Disposed about the sleeve 50 is a coupling nut 150. The coupling nut 150 includes a stepped bore 151 (see FIGS. 2, 3 and 8). The end 49 of the sleeve 50 is adapted to be moved through a small diameter portion 152 (see FIG. 3) of the stepped bore whereas an end portion 154 of the opposite, large internal diameter portion of the coupling nut is threaded internally. The internally threaded end portion is adapted to be turned over the externally threaded portion of the enlarged diameter portion 126 of the sleeve and out of engagement with the threaded portion of the sleeve 50 until the enlarged end portion 126 of the sleeve engages a shoulder 156 (see FIGS. 2 and 3) at the intersection of the small and large diameter portions of the stepped bore 151.

When it is desired to interconnect two optical fibers each of which is terminated by a single optical fiber hermaphroditic connector, a craftsperson turns out the coupling nut 150 of a first one of the connectors until its internally threaded end has become disengaged from the threads of the enlarged diameter end 126 of the sleeve. Then the craftsperson grasps an exposed large diameter end of the sleeve of the second connector which terminates the other fiber and backs off the coupling nut 150 of the second connector from the ferrule thereof until the coupling nut is disengaged from the externally threaded portion of the sleeve of the second connector. The craftsperson causes the longitudinaly extending portions 102—102 and overlying fingers 130—130 of the second connector to be displaced 90° to the elongated portions and fingers of the first connector. With this orientation, the craftsperson moves the connectors together thereby causing end faces of the plugs thereof to be in connective juxtaposition with each other. Then the craftsperson turns the coupling nut 150 of the first connector further toward the second connector to engage the threaded enlarged end portion of the sleeve of the second connector. Continued turning causes the shoulder 156 within the coupling nut of the first connector to engage the peripheral face of the enlarged end portion 126 of the sleeve 50 of the first connector (see FIGS. 2 and 3) and causes the two connectors to be drawn together and secured in connective relationship. O-rings 132—132 (see FIGS. 2 and 3) mate and seal against water entry.

Each connector also may be provided with a dust cover 160 (see FIG. 1). The dust cover is attached to the connector by a cord 161 which may be looped about the externally threaded portion of the end cap 46. The dust cover 160 includes a portion 162 which is threaded internally and which is adapted to be turned over the externally threaded portion of the enlarged end portion 126 of the sleeve 50. The portion 162 may be turned threadably over a smaller diameter externally threaded portion 164 which is adapted to have the internally threaded portion 162 of another dust cover turned thereover to secure the dust covers after the dust covers have been removed from their associated sleeves 50—50 to permit mating of the connectors 20—20. In order that dust covers 160—160 of two connectors to be joined together themselves may be mated, each end of each dust cover is provided with extending, diametrically opposed fingers 166—166. When it is desired to mate two dust covers 160—160, one dust cover is turned relative to the other until the fingers 166—166 of one become aligned with those of the other but displaced 90° therefrom after which relative longitudinal motion causes the fingers of one to become interdigitated with the fingers of the other. Then the portion 162 of one of the dust covers is turned outwardly to cause its internally threaded end portion to be turned onto the externally threaded portion 164 of the other dust cover.

It is to be understood that the above-described arrangements are simply illustrative of the invention. Other arrangements may be devised by those skilled in the art which will embody the principles of the invention and fall within the spirit and scope thereof.

We claim:

1. A single optical fiber hermaphroditic connector, said connector comprising:

a shell through which an optical fiber end portion is adapted to extend;

a ferrule which is adapted to terminate the end portion of a single optical fiber and which is disposed adjacent to one end of said shell;

supporting means disposed adjacent said one end of said shell for holding said ferrule, said supporting means including circumferentially spaced portions which extend longitudinally along and beyond a portion of said ferrule;

a sleeve in which are received said shell, said ferrule and said supporting means, said sleeve including circumferentially spaced longitudinally extending fingers each of which is disposed outside and aligned with an associated one of said longitudinally extending portions of said supporting means; and securing means engaging said sleeve adjacent to said ferrule for causing another identical single optical fiber hermaphroditic connector to be held in aligned juxtaposition with said connector such that each longitudinally extending portion and associated finger of the other connector are received between adjacent longitudinally extending portions and associated fingers of said connector and such that an end face of the ferrule of the other connector is disposed in optical connective engagement with the ferrule of said connector.

2. A single optical fiber hermaphroditic connector, said connector a shell through which an optical fiber end portion is adapted to extend;

force transfer means disposed at an opposite end of said shell for receiving an optical fiber cable at one end thereof and for transferring forces which may be applied to said cable to portions of said connector displaced from a connection with another said single optical fiber hermaphroditic connector;

a ferrule which is adapted to terminate the end portion of a single optical fiber and which is disposed adjacent to one end of said shell;

supporting means disposed adjacent said one end of said shell for holding said ferrule, said supporting means including circumferentially spaced portions which extend longitudinally along and beyond a portion of said ferrule;

a sleeve in which are received said shell, said ferrule, said force transfer means and said supporting means, said sleeve including circumferentially spaced longitudinally extending fingers each of which is disposed outside and alinged with an associated one of said longitudinally extending portions of said supporting means; and securing means engaging said sleeve adjacent to said ferrule for causing another identical single optical fiber hermaphroditic connector to be held in aligned juxtaposition with said connector such that each longitudinally extending portion and associated finger of the other connector are received between adjacent of longitudinally extending portions and associated fingers of said connector and such that an end face of the ferrule of the other connector is disposed in optical connective engagement with the ferrule of said connector.

3. A single optical fiber hermaphroditic connector, said connector comprising:

a shell through which an optical fiber end portion is adapted to extend;

force transfer means disposed at an opposite end of said shell for receiving an optical fiber cable at one end thereof and for transferring forces which may be applied to said cable to portions of said connector displaced from a connection with another said single optical fiber hermaphroditic connector;

a ferrule which is adapted to terminate the end portion of the optical fiber and which is disposed adjacent to one end of said shell;

supporting means disposed adjacent said one end of said shell for holding said ferrule, said supporting means including diametrically opposed portions which extend longitudinally along and beyond a portion of said ferrule;

a sleeve in which are received said shell, said ferrule, said force transfer means and said supporting means, said sleeve including diametrically opposed longitudinally extending fingers each of which is disposed outside and aligned with an associated one of said longitudinally extending portions of said supporting means; and securing means engaging said sleeve adjacent to said ferrule for causing another identical single optical fiber hermaphroditic connector to be held in aligned juxtaposition with said connector such that each longitudinally extending portion and associated finger of the other connector are received between the adjacent longitudinally extending portions and associated fingers of said connector and such that an end face of the ferrule of the other connector is disposed in optical connective engagement with the ferrule of said connector.

4. The single optical fiber hermaphroditic connector of claim 3, wherein said securing means comprises a coupling nut having an internally threaded end portion, and wherein a portion of each end portion of said sleeve of each said connector is threaded externally so that an externally threaded portion of the sleeve of the other connector threadably engages with said internally threaded portion of said coupling nut of said single optical fiber hermaphroditic connector.

5. The single fiber hermaphroditic connector of claim 4, wherein said coupling nut includes a stepped bore with an end portion of a large diameter portion of said bore of said coupling nut being threaded internally to engage threadably an externally threaded end portion of a sleeve.

6. The single optical fiber hermaphroditic connector of claim 5, wherein one end portion of said sleeve has a diameter which is less than the diameter of another portion of said sleeve which is threaded externally with a peripheral surface being formed at the intersection of the one end portion and the other externally threaded end portion of the sleeve, said coupling nut including a shoulder at the intersection of the large diameter portion and a small diameter portion of said bore of said coupling nut such that said shoulder engages said peripheral face and said internally threaded end portion of said coupling nut engaging an externally threaded end portion of the sleeve of the other connector to hold the other connector in secured relation to said connector.

7. The single optical fiber connector of claim 6, wherein said supporting means comprises a housing which includes a stepped bore with a smaller diameter portion thereof being adapted to have an optical fiber extend therethrough and opening to said shell and with a larger diameter portion adapted to receive at least an end portion of said ferrule, said housing including a flanged end disposed adjacent to said ferrule, said flanged end having a key projecting radially therefrom and being adapted to be received in a keyway of said sleeve, said key being aligned longitudinally with one of said longitudinally extending fingers of said supporting means, said sleeve at said small diameter end portion adjacent to a cable entrance end of said connector having diametrically opposed slots formed therein.

8. The single optical fiber hermaphroditic connector of claim 7, wherein said connector including an end cap through which the optical fiber extends with a large diameter portion of said end cap being threaded internally to threadably engage the threaded small diameter portion of said sleeve.

9. The single optical fiber hermaphroditic connector of claim 8, which is adapted to terminate an optical fiber cable which includes a single optical fiber and a non-metallic filamentary strength system, wherein said force transfer means includes:

means disposed adjacent to a cable entrance end of said sleeve and through which the single optical fiber is adapted to extend for clamping portions of the non-metallic strength system of the cable to transfer forces from the cable to said sleeve, said force transfer means including two conformable, substantially smooth, conically shaped surfaces which are adapted to be held in mating relationship with each other with portions of the strength member system therebetween and such that each diverges in a direction from said cable entrance end of said sleeve toward another end thereof such that an included angle between diametrically opposed lines on each surface which are disposed generally in a plane passing through the longitudinal axis of the connector does not exceed a predetermined value, the predetermined value being sufficiently low to avoid breakage of said portions of said strength system but which are sufficient to provide a self enhancing locking arrangement for said strength members.

10. The single optical fiber hermaphroditic connector of claim 9 wherein said force transfer means includes a bushing which includes diametrically opposed tabs each of which is adapted to be received in one of said slots of said small diameter portion of said sleeve.

11. The single optical fiber hermaphroditic connector of claim 10, wherein said shell includes semi-cylindrical halves which are adapted to be assembled together with one end portion of said assembled halves being connected to an end portion of said force transfer means and the other end portion of said shell being connected to an end of said housing, said supporting means including a compression spring which is disposed concentrically about said housing and which is effective to bias said housing and said ferrule outwardly of said sleeve so that said ferrule engages an end portion of a ferrule of another connector identical to said single optical fiber hermaphroditic connector.

12. The single optical fiber hermaphroditic connector of claim 3, wherein each of the longitudinally extending portions of said supporting means includes a free end portion which has been deflected toward a longitudinal axis of said connector.

13. A single optical fiber cable which is terminated with a single optical fiber connector, the terminated cable comprising:
an optical fiber cable which includes a single optical fiber and non-metallic filamentary strength members; and
a single optical fiber connector, said connector comprising:
a shell through which an optical fiber end portion is adapted to extend;
force transfer means disposed at an opposite end of said shell for receiving an optical fiber cable at one end thereof and for transferring forces which may be applied to said cable to portions of said connector displaced from a connection with another said single optical fiber hermaphroditic connector;
a ferrule which is adapted to terminate the end portion of the optical fiber and which is disposed adjacent to one end of said shell;
supporting means disposed adjacent said one end of said shell for holding said ferrule, said supporting means including diametrically opposed portions which extend longitudinally along and beyond a portion of said ferrule;
a sleeve in which are received said shell, said ferrule, said force transfer means and said supporting means, said sleeve including diametrically opposed longitudinally extending fingers each of which is disposed outside and aligned with an associated one of said longitudinally extending portions of said supporting means; and
securing means engaging said sleeve adjacent to said ferrule for causing another identical single optical fiber hermaphroditic connector to be held in aligned juxtaposition with said connector such that each longitudinally extending portion and associated finger of the other connector are received between the adjacent longitudinally extending portions and associated fingers of said connector and such that an end face of the ferrule of the other connector is disposed in optical connective engagement with the ferrule of said connector.

14. The terminated cable of claim 13, wherein said securing means comprises a coupling nut having an internally threaded end portion, and wherein a portion of each end portion of said sleeve of each said connector is threaded externally so that when two connectors are mated, the internally threaded portion of the coupling nut of one such connector engages with an externally threaded portion of said sleeve of the other connector.

15. The terminated cable of claim 13, wherein said coupling nut includes a stepped bore with an end portion of a large diameter portion of said coupling nut being threaded internally to engage threadably an externally threaded end portion of a sleeve.

16. The terminated single optical fiber cable of claim 13, wherein one end portion of said sleeve is a small diameter threaded portion and said connector including an end cap through which the optical fiber extends with a large diameter portion of said end cap being threaded internally to threadably engage said threaded small diameter portion of said sleeve.

17. The terminated single optical fiber cable of claim 16, wherein an elastomeric bushing is disposed about said optical fiber cable and is disposed between said end cap and a compression member, said elastomeric bushing and said compression member being adapted to be received within a small diameter portion of said end cap, said connector further including bushing means turned threadably onto an externally threaded portion of said end cap to cause said elastomeric bushing to be compressed to provide a seal.

18. The terminated single optical fiber cable of claim 13, which is adapted to terminate an optical fiber cable which includes a single optical fiber and a non-metallic filamentary strength system, said force transfer means including:
force transfer means disposed adjacent to a cable entrance end of said sleeve and through which the single optical fiber extends for clamping portions of the non-metallic strength system of the cable to transfer forces from the cable to said sleeve, said force transfer means including two conformable, substantially smooth, conically shaped surfaces which are held in mating relationship with each other with portions of the strength member system therebetween and which each diverge in a direction from said cable entrance end of said sleeve toward another end thereof such that an included angle between diametrically opposed lines on each surface which are disposed generally in a plane passing through the longitudinal axis of the connector does not exceed a predetermined value, the predetermined valve being efficiently low to avoid breakage of said strength members at locations where said strength members diverge from the longitudinal axis but which are sufficient to provide a self enhancing locking arrangement for said strength members.

19. The terminated single optical fiber cable of claim 13, wherein portions of each longitudinally extending portion of said supporting means have been deflected toward a longitudinal axis of said connector.

20. A single optical fiber hermaphroditic connector, said connector comprising:
a shell through which an optical fiber end portion is adapted to extend;

a ferrule which is adapted to terminate the end portion of a single optical fiber and which is disposed adjacent to one end of said shell;

supporting means disposed adjacent said one end of said shell for holding said ferrule, said supporting means including circumferentially spaced portions which extend longitudinally along and beyond a portion of said ferrule;

a sleeve in which are received said shell, said ferrule and said supporting means, said sleeve including circumferentially spaced longitudinally extending fingers each of which is disposed outside and aligned with an associated one of said longitudinally extending portions of said supporting means; and said supporting means for holding said ferrule including means which cooperate with another single optical fiber hermaphroditic connector in juxtaposition with said single optical fiber hermaphroditic connector such that when the fingers extending from the sleeve and the associated longitudinally extending portions of the supporting means of the other connector become interposed circumferentially between fingers and longitudinally extending portions of said single optical fiber hermaphroditic connector, the hermaphroditic connectors may be secured together such that the end faces of the ferrules thereof are disposed to cause the optical fibers terminated by the ferrules to be in optical connective relationship.

* * * * *